3,405,189
METHOD FOR INHIBITING POLYMERIZATION OF
ISOPRENE AND/OR 1,3-PENTADIENE
Taketami Sakuragi, Tokyo, and Tatsuo Sakashita, Kamakura-shi, Japan, assignors to The Japanese Geon Co.,
Ltd., a corporation of Japan
No Drawing. Filed May 16, 1967, Ser. No. 638,716
Claims priority, application Japan, May 25, 1966,
41/32,929
8 Claims. (Cl. 260—666.5)

ABSTRACT OF THE DISCLOSURE

The tendency for isoprene and/or 1,3-pentadiene to polymerize when heated as solutions in polar solvents such as dimethylformamide is reduced by adding minor amounts, up to 10% by weight of solvent, of furfural or of an aromatic nitro compound. Synergism with known inhibitors such as sodium nitrite and beta-naphthylamine is shown.

This invention relates to a method of reducing the tendency of isoprene and/or 1,3-pentadiene to polymerize in solutions exposed to elevated temperatures.

It is known to use the techniques of solvent absorption and extractive distillation in processes for separating the valuable industrial raw material isoprene or 1,3-pentadiene in good yield and high purity from isoprene- and/or 1,3-pentadiene-containing gas mixture such as the so-called $C_5$-hydrocarbon fractions whose chief constituents are, for example, isoprene, 1,3-pentadiene, n-pentane, isopentane, pentene-1, pentene-2, 2-methylbutene-1,2-methylbutene-2, cyclopentadiene, etc. It is also known that typical solvents used in these processes include acetonitrile, dimethylformamide, acetone and N-methylpyrrolidone. In the operation of these processes, however, the solvent containing the isoprene or 1,3-pentadiene is necessarily exposed to elevated temperatures, e.g., from 80° to 150° C. or even higher, with the consequence that the isoprene or 1,3-pentadiene in the solvent tends to polymerize. As a result, difficulties arise from the clogging of the apparatus with the separating polymer and the formation of a polymeric coating on the inside wall of the apparatus, and continuous operation over an extended period of time becomes practically impossible.

After considerable research, we have found that the incorporation of furfural or an aromatic nitro compound in a solution of isoprene and/or 1,3-pentadiene reduces the tendency of the isoprene and 1,3-pentadiene to polymerize. In particular, we have found that little or no polymerization of isoprene or 1,3-pentadiene occurs when the solution is exposed to elevated temperatures. This is so even in the presence of iron rust which is generally believed to promote the polymerization of isoprene or 1,3-pentadiene at elevated temperatures. The term "1,3-pentadiene" used herein should be understood to mean both cis- and trans-1,3-pentadienes.

Accordingly the present invention provides a method of reducing the tendency of isoprene and/or 1,3-pentadiene to polymerize in solutions exposed to elevated temperatures, which comprises adding to the solution, as polymerization inhibitor, furfural or an aromatic nitro compound.

The invention also includes an isoprene or 1,3-pentadiene solution comprising, as polymerization inhibitor, furfural or an aromatic nitro compound.

The invention is particularly applicable to isoprene or 1,3-pentadiene solutions wherein the solvent is a typical solvent used in the separation of isoprene or 1,3-pentadiene from isoprene- or 1,3-pentadiene-containing gas mixtures by solvent absorption or extractive distillation, as discussed hereinbefore. By means of the invention, it is, therefore, possible to separate isoprene or 1,3-pentadiene stably and continuously over an extended period of time from the mixed gases containing isoprene or 1,3-pentadiene my means of the solvent absorption and extractive distillation processes, without employing apparatus made from such expensive materials as stainless steel.

Although the amount of the furfural or aromatic nitro compound used is capable of wide variation depending upon such factors as the class of solvent, the water content of the solvent, operating conditions and the presence or absence of iron rust, in general it is satisfactory to incorporate 0.01–10%, preferably 0.05–5%, based on the weight of the solvent. It is, however, possible to add higher proportions if desired, as no particular detrimental effects are observed.

Especially suitable aromatic nitro compounds include nitrobenzene, nitrobenzene derivatives such as halo-substituted nitrobenzenes (e.g., 1-chloro-2-nitrobenzene) and alkyl-substituted nitrobenzenes (e.g., nitrotoluenes) and dinitrobenzene derivatives such as o-, p-, and m-dinitrobenzene, halo-substituted dinitrobenzenes (e.g. 1-chloro-2,4-dinitrobenzene) and alkyl-substituted dinitrobenzenes (e.g., dinitrotoluenes).

The polymerization inhibiting effect of the furfural or aromatic nitro compounds is further promoted by the cojoint presence in the system of substances which are well known for use as polymerization inhibitors or stabilizers of unsaturated compounds. The conventional amounts, or less, of such substance may be used. Presumably, this is the result of a synergistic action of some sort or other between these substances and the additive used in accordance with the present invention. Known substances of this class include, for example, sodium nitrite, Methylene Blue, sulphur, phenolic compounds such as tertiary butyl catechol, and aromatic amines such as β-naphthylamine.

It is to be noted that the solvent solutions containing isoprene or 1,3-pentadiene or both can be equally prevented from polymerization by the incorporation of furfural or an aromatic nitro compound. Further, the polymerization inhibiting effect of furfural or an aromatic nitro compound does not decrease at all even in the presence of acetylenes such as vinyl acetylene. More specifically, polymer formation can be inhibited by adding furfural or an aromatic nitro compound to a solution containing the acetylenes in addition to isoprene and/or 1,3-pentadiene. Furfural and an aromatic nitro compound are also effective in the presence of saturated hydrocarbons such as n-pentane and isopentane, monoolefins such as pentene-1, pentene-2 and 2-methylbutene-1, and cyclopentadiene. Accordingly, the incorporation of furfural or an aromatic nitro compound to the so-called $C_5$-hydrocarbon fraction is completely effective to inhibit undesired polymerization of isoprene and 1,3-pentadiene.

Examples 1–6

An autoclave having iron rust present on its inside wall was charged with dimethylformamide and the various compounds in the amounts hereinafter indicated. Isoprene was introduced to a gauge pressure of 3.5 kg./cm.$^2$, while maintaining a temperature of 120° C. The mixtures were in contact with the iron rust. On examining the solutions 10 hours later, the following results were obtained.

| Ex. No. | Additive | State of solution |
|---|---|---|
| 1 | None | Polymer separated. |
| 2 | Hydroquinone (200 p.p.m.) | Do. |
| 3 | β-Naphthylamine (200 p.p.m.) | Do. |
| 4 | Furfural (5 vol. percent) | Slightly turbid. |
| 5 | Nitrobenzene (3 vol. percent) | Perfectly transparent. |
| 6 | m-Dinitrobenzene (5,000 p.p.m.) | Do. |

Examples 7–19

The autoclave used in Examples 1–6 was charged with dimethylformamide and various additives in the amounts hereinafter indicated. Then, while maintaining a temperature of 150° C., isoprene was introduced to a gauge pressure of 3.5 kg./cm.$^2$. The mixtures were in contact with the iron rust. After 20 hours, the states of the solutions were observed with the following results.

| Ex. No. | Additive | State of solution |
|---|---|---|
| 7 | None | Polymer separated. |
| 8 | Sodium nitrite (200 p.p.m.) | Turbid. |
| 9 | Sulphur (5,000 p.p.m.) | Polymer separated. |
| 10 | Methylene Blue (200 p.p.m.) | Do. |
| 11 | Hydroquinone (200 p.p.m.) | Do. |
| 12 | β-Naphthylamine (200 p.p.m.) | Do. |
| 13 | Furfural (1 vol. percent) and sodium nitrite (200 p.p.m.). | Practically transparent. |
| 14 | Furfural (5 vol. percent) and sulphur (500 p.p.m.). | Slightly turbid. |
| 15 | Furfural (5 vol. percent) and Methylene Blue (200 p.p.m.). | Do. |
| 16 | Nitrobenzene (1 vol. percent) and sodium nitrite (200 p.p.m.). | Perfectly transparent. |
| 17 | Nitrobenzene (3 vol. percent) and Methylene Blue (200 p.p.m.). | Do. |
| 18 | o-Nitrophenol (5,000 p.p.m.) and sodium nitrite (200 p.p.m.). | Practically transparent. |
| 19 | o-Nitrophenetole (10,000 p.p.m.) and sodium nitrite (200 p.p.m.). | Do. |

Examples 20–23

The autoclave used in Examples 1–6 was charged with N-methylpyrrolidone and various additives in the amounts hereinafter indicated. While maintaining a temperature of 120° C., isoprene was introduced to a gauge pressure of 3.5 kg./cm.$^2$. The mixtures were in contact with the iron rust. After 20 hours, the states of the solutions were observed with the following results.

| Ex. No. | Additive | State of solution |
|---|---|---|
| 20 | None | Polymer separated. |
| 21 | Nitrobenzene (3 vol. percent) | Practically transparent. |
| 22 | Nitrobenzene (1 vol. percent) and sodium nitrite (200 p.p.m.). | Perfectly transparent. |
| 23 | Furfural (3 vol. percent) and Methylene Blue (500 p.p.m.). | Do. |

Examples 24–41

An autoclave having iron rust on its inside wall was charged with dimethylformamide and various additives in the amounts hereinafter indicated, while maintaining a temperature of 155° C., 1,3-pentadiene (67:33 (by weight) trans-1,3-pentadiene/cis-1,3-pentadiene) was introduced to a gauge pressure of 2.5 kg/cm.$^2$. The mixtures were in contact with the iron rust. After 20 hours, the states of the solutions were observed with the following results.

| Ex. No. | Additive | State of solution |
|---|---|---|
| 24 | None | Polymer separated. |
| 25 | Sodium nitrite (1,000 p.p.m.) | Do. |
| 26 | Sulphur (500 p.p.m.) | Do. |
| 27 | β-Naphthylamine (200 p.p.m.) | Do. |
| 28 | Hydroquinone (200 p.p.m.) | Do. |
| 29 | Methylene Blue (200 p.p.m.) | Do. |
| 30 | Furfural (5 vol. percent) | Slightly turbid. |
| 31 | Nitrobenzene (3 vol. percent) | Practically transparent. |
| 32 | Nitrobenzene (10 vol. percent) | Perfectly transparent. |
| 33 | m-Dinitrobenzene (20,000 p.p.m.) | Do. |
| 34 | o-Nitrophenol (20,000 p.p.m.) | Do. |
| 35 | Nitrobenzene (3 vol. percent) and sodium nitrite. | Do. |
| 36 | Furfural (3 vol. percent) and sodium nitrite (200 p.p.m.). | Do. |
| 37 | Furfural (5 vol. percent) and sulphur (500 p.p.m.). | Slightly turbid. |
| 38 | Nitrobenzene (3 vol. percent) and hydroquinone (200 p.p.m.). | Practically transparent. |
| 39 | Furfural (5 vol. percent) and Methylene Blue (500 p.p.m.). | Perfectly transparent. |
| 40 | m-Dinitrobenzene (5,000 p.p.m.) and sodium nitrite (200 p.p.m.). | Practically transparent. |
| 41 | o-Nitrophenol (10,000 p.p.m.) and sodium nitrite (200 p.p.m.). | Perfectly transparent. |

Examples 42–46

The autoclave used in the preceding examples was charged with dimethylformamide and various additives in the amounts hereinafter indicated. While maintaining a temperature of 155° C., the equal volume mixture of isoprene and 1,3-pentadiene (which consists of 67% by weight of trans-1,3-pentadiene and 33% by weight of cis-1,3-pentadiene) is introduced to a gauge pressure of 3.0 kg./cm.$^2$. After 20 hours, the states of the solutions were observed with the following results.

| Ex. No. | Additive | State of solution |
|---|---|---|
| 42 | None | Polymer separated. |
| 43 | Sodium nitrite (200 p.p.m.) | Slight amount of polymer separated. |
| 44 | Nitrobenzene (10 vol. percent) | Practically transparent. |
| 45 | Furfural (3 vol. percent) and sodium nitrite (200 p.p.m.). | Perfectly transparent. |
| 46 | Nitrobenzene (3 vol. percent) and sodium nitrite (200 p.p.m.). | Do. |

Examples 47–52

A glass or stainless steel tube was charged with dimethylformamide and various additives in the amounts hereinafter indicated. While maintaining a temperature of 150° C., the same gas mixture as used in Examples 42–46 was introduced to a gauge pressure of 3.5 kg./cm.$^2$. After 20 hours, the states of the solutions were observed with the following results.

| Ex. No. | Additive | State of solution |
|---|---|---|
| 47 | None | Polymer separated. |
| 48 | Furfural (3 vol. percent) | Practically transparent. |
| 49 | Nitrobenzene (1 vol. percent) | Do. |
| 50 | m-Dinitrobenzene (10,000 p.p.m.) | Perfectly transparent. |
| 51 | Furfural (3 vol. percent) and sodium nitrite (200 p.p.m.). | Do. |
| 52 | Nitrobenzene (3 vol. percent) and sulphur (500 p.p.m.). | Do. |

Examples 53–55

The autoclave having iron rust on its inside wall was charged with acetonitrile and various additives in the amounts hereinafter indicated. While maintaining a temperature of 120° C., 1,3-pentadiene is introduced to a gauge pressure of 13 kg./cm.$^2$. After 24 hours, the states of the solutions were observed with the following result.

| Ex. No. | Additive | State of solution |
|---|---|---|
| 53 | None | Large amount of polymer separated. |
| 54 | Furfural (3 vol. percent) | Slightly turbid. |
| 55 | Furfural (3 vol. percent) and sodium nitrite (200 p.p.m.). | Perfectly transparent. |

Example 56

The autoclave used in Examples 53–55 was charged with dimethylformamide together with nitrobenzene (3 vol. percent) and sodium nitrite (200 p.p.m.). While maintaining a temperature of 130° C., the mixture of 90% by volume of isoprene and 10% by volume of vinyl acetylene was introduced to a gauge pressure of 3 kg./cm.$^2$. After 24 hours, the state of the solution was perfectly transparent and no polymer separation was observed.

Examples 57–62

An autoclave having iron rust on its inside wall was charged with dimethylformamide and various additives in the amounts hereinafter indicated. While maintaining a temperature of 155° C., the $C_5$-hydrocarbon fraction containing

|  | Mol. percent |
|---|---|
| n-Pentane | 24.35 |
| i-Pentane | 15.02 |
| Isoprene | 15.08 |
| 2-methylbutene-1 | 6.71 |
| Pentene-1 | 5.61 |
| Trans-1,3-pentadiene | 5.35 |
| Cyclopentadiene | 4.58 |
| Trans-pentene-2 | 3.83 |
| 2-methylbutene-2 | 3.32 |
| Cis-1,3-pentadiene | 3.06 |
| Cyclopentene | 2.61 |
| Cis-pentene-2 | 2.27 |
| 1,4-pentadiene | 1.46 |
| 2-methylbutene-1 | 1.13 |
| Cyclopentane | 0.96 |

Acetylenes (calcd. as α-acetylene), 600 p.p.m.

was introduced to a gauge pressure of 3.0 kg./cm.$^2$. The mixtures were in contact with the iron dust. After 20 hours, the states of the solutions were observed with the following results.

| Ex. No. | Additive | State of solution |
|---|---|---|
| 57 | None | Small amount of polymer separated. |
| 58 | Sodium nitrite (200 p.p.m.) | Turbid. |
| 59 | Furfural (5 vol. percent) | Perfectly transparent. |
| 60 | Nitrobenzene (5 vol. percent) | Do. |
| 61 | Furfural (3 vol. percent) and sodium nitrite (200 p.p.m.). | Do. |
| 62 | Nitrobenzene (3 vol. percent) and sodium nitrite (200 p.p.m.). | Do. |

What we claim is:

1. A method of reducing the tendency of isoprene or 1,3-pentadiene to polymerize in solutions exposed to elevated temperatures, which comprises adding to the solution as polymerization inhibitor furfural in an amount of from 0.01% to 10% based on the weight of solvent.

2. A method according to claim 1 wherein said solvent is acetonitrile, dimethylformamide, acetone, or N-methylpyrrolidone.

3. A method according to claim 1 wherein said amount is 0.05% to 5%.

4. A method of reducing the tendency of isoprene or 1,3-pentadiene to polymerize in solutions exposed to elevated temperatures, which comprises adding to the solution, as polymerization inhibitor, an aromatic nitro compound in an amount of from 0.01% to 10% based on the weight of solvent.

5. A method according to claim 4, wherein the aromatic nitro compound is nitrobenzene, a dinitrobenzene, a monohalodinitrobenzene, or a dinitrotoluene.

6. A method according to claim 4 wherein said amount is 0.05% to 5%.

7. A method according to claim 4, wherein, in addition to the said polymerization inhibitor, there is also added a known inhibitor of unsaturated compounds.

8. A method according to claim 7, wherein the known inhibitor is sodium nitrite, Methylene Blue, sulphur, tertiary butyl catechol, or β-naphthylamine.

References Cited

UNITED STATES PATENTS

| 2,478,045 | 8/1949 | Hatch et al. | 260—666.5 |
| 2,730,489 | 1/1956 | Lewis | 260—666.5 X |
| 3,309,412 | 3/1967 | Sakuragi et al. | 260—666.5 |

DELBERT E. GANTZ, *Primary Examiner.*

G. E. SCHMITKONS, *Assistant Examiner.*